United States Patent [19]
Thompson et al.

[11] Patent Number: 4,826,625
[45] Date of Patent: May 2, 1989

[54] METHODS FOR TREATING HYDROCARBON RECOVERY OPERATIONS AND INDUSTRIAL WATERS

[75] Inventors: Neil E. S. Thompson; Robert G. Asperger, both of St. Louis, Mo.

[73] Assignee: Petrolite Corporation, St. Louis, Mo.

[21] Appl. No.: 88,190

[22] Filed: Aug. 21, 1987

Related U.S. Application Data

[63] Continuation-in-part of Ser. No. 919,119, Oct. 15, 1986, Pat. No. 4,689,177, and a continuation-in-part of Ser. No. 7,701, Jan. 28, 1987, and a continuation-in-part of Ser. No. 645,740, Aug. 30, 1984, abandoned.

[51] Int. Cl.$^4$ .................. B01D 17/00; C10G 33/04; C07C 155/06
[52] U.S. Cl. ................... 252/344; 208/188; 558/237
[58] Field of Search .................. 252/344; 208/188; 558/237

[56] References Cited

U.S. PATENT DOCUMENTS

| | | | |
|---|---|---|---|
| 1,788,632 | 1/1931 | Powers | 558/244 |
| 2,356,764 | 8/1944 | Kern | 528/387 |
| 3,364,108 | 1/1968 | Nakanishi et al. | 514/326 |
| 4,179,460 | 12/1979 | Georgieu et al. | 558/236 |

FOREIGN PATENT DOCUMENTS 200143 12/1986 European Pat. Off. ............ 558/244

Primary Examiner—Mary C. Lee
Assistant Examiner—Robert C. Whittenbaugh
Attorney, Agent, or Firm—Robert E. Wexler

[57] ABSTRACT

Use of nitrogen-containing tridithiocarbamic acid compositions as reverse demulsifiers.

5 Claims, No Drawings

METHODS FOR TREATING HYDROCARBON RECOVERY OPERATIONS AND INDUSTRIAL WATERS

This application is a continuation-in-part of application Ser. No. 919,119, filed Oct. 15, 1986 now U.S. Pat. No. 4,689,177; Ser. No. 7,701, filed Jan. 28, 1987 and Ser. No. 645,740 filed Aug. 30, 1984 (now abandoned). applications Ser. No. 7,701 and 919,119 are continuation-in-part applications of application Ser. No. 645,740.

BACKGROUND OF THE INVENTION

1. Field of the Invention

This invention relates to tridithiocarbamic acid compounds having utility in hydrocarbon recovery, production, transportation and storage operations and in the treatment of industrial waters.

In particular, the invention relates to nitrogen-containing tridithiocarbamic acid compounds having use as demulsifiers and to a method of resolving emulsions therewith.

2. Prior Art

In general, the preparation of nitrogen-containing dithiocarbamic acids and certain derivatives thereof is well known. Various types of such compounds have been disclosed as having utility as fungicides, biocides, film formers, vulcanization accelerators, extreme pressure agents for lubricants and corrosion inhibitors.

The following patents are considered pertinent to the present invention:

U.S. Pat. Nos. 2,326,643, 2,356,764, 2,400,934, 2,589,209 and 2,609,389 disclose reaction products of carbon disulfide with alkylene polyamines, the products being dithiocarbamic acids or their salts. U.S. Pat. Nos. 2,609,389 and 2,693,485 disclose the reaction products of lower alkylene diamines with carbon disulfide and the use of such reaction products of alkylene polyamines with carbon disulfide, the products being further reacted with aldehydes to form condensation polymers. U.S. Pat. No. 2,400,934 discloses the reaction product of 1-diethyl-amino-4-aminopentane with carbon disulfide as an intermediate in a purification process. U.S. Pat. No. 2,326,643 discloses polydithiocarbamate reaction products of carbon disulfide with aliphatic polyamines and their use as intermediates in a subsequent reaction. U.S. Pat. No. 2,356,764 discloses monodithiocarbamate reaction products of alkylene diamines with carbon disulfide and the use of such products as film formers.

U.S. Pat. No. 2,561,208 discloses the reation product of carbon disulfide with diamines having cyclohexyl groups in their chain and their use in preparing in rubber vulcanization accelerators, bactericides and fungicides.

U.S. Pat. No. 2,733,262 discloses reaction products of carbon disulfide with N(hydroxyalkyl)alkylene diamines, the reaction products being bis-dithiocarbamic acids having agricultural fungicidal activity.

U.S. Pat. No. 3,392,192 discloses inner salt reaction products of carbon disulfide with internally alkoxylated diamines, such products having utility as corrosion inhibitors and as extreme pressure agents for lubricants.

SUMMARY OF THE INVENTION

In accordance with the present invention it has been unexpectedly found that certain nitrogen-containing tridithiocarbamic acid compounds have exceptional utility as demulsifiers, particularly in the treatment of liquids associated with hydrocarbon recovery, production, transportation and storage operations and in the treatment of industrial waters.

DESCRIPTION OF PREFERRED EMBODIMENTS

The compounds of the invention which are used in the method of the present invention are generically represented by the following formula:

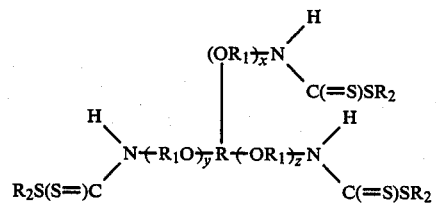

wherein:
R represents an alkane triyl group;
$R_1$ represents an alkylene group;
$R_2$ represents an alkali or alkaline earth metal group or an ammonium group; and
x, y, and z represent integers which may be the same or different but each must equal at least 1, the sum of x+y+z, on average, being equal to 3 to 250.

Alkane triyl groups, i.e., R of formula 1, are saturated hydrocarbon groups of 1 to 30 carbon atoms having three open valences, e.g., —R— as represented by

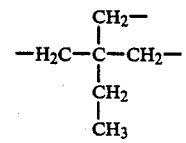

(dimethyl butane triyl). Other representative alkane triyl groups of 1 to 30 carbon atoms are

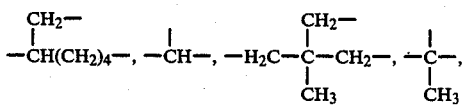

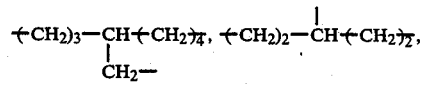

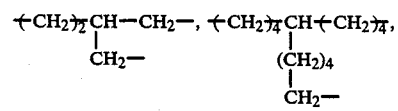

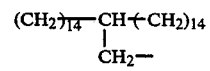

and similar groups which may be substituted by functional groups well known to those skilled in the art.

Alkylene groups, i.e., $R_2$ of formula 1, include branched and unbranched alkylene groups containing from 1 to about 30 carbon atoms or more, e.g. methylene, ethylene, trimethylene (i.e., $-CH_2CH_2CH_2-$), tetramethylene, octadecylmethylene, eicosamethylene, pentacosamethylene, triacontamethylene, methylethylene (e.g., $$-\underset{\underset{CH_3}{|}}{HC}-CH_2-),$$

butylene, diethylhexamethylene (e.g., $$-H_2C\underset{\underset{C_2H_5}{|}}{\overset{\overset{C_2H_5}{|}}{C}}CH_2CH_2CH_2CH_2-),$$

tetramethyl dodecamethylene (e.g., —H$_2$CCH$_2$CH(CH$_3$)CH$_2$CH(CH$_3$)CH$_2$CH$_2$CH(CH$_3$)CH$_2$CH$_2$—) and the like, which groups may be substituted by functional groups well known to those skilled in the art (e.g., halo, haloalkyl, hydroxyl, alkoxyl, aryloxyl, phenyl, alkylphenyl).

Alkali and alkaline earth metal and ammonium groups represented by R$_2$ include Na, K, Li, Ca, Mg and NH$_4$.

The integers x, y and z may be the same or different but each must equal at least 1. The sum of x+y+z, on average, equals 3 to 250, preferably 3 to 100, more preferably 3 to 50, especially 3 to 10. In the most useful compounds used in the invention, the sum of x+y+z, on average, is equal to 3 to about 6.

The following compound has been found especially useful in the method of the present invention:

[Structure of compound 2]

Thus, the compound of formula 2 is a specie of formula 1 wherein:

$$R = -CH_2-\underset{\underset{\underset{CH_3}{|}}{\underset{CH_2}{|}}}{\overset{\overset{CH_2-}{|}}{C}}-CH_2-; \quad R_2 = -\underset{\underset{CH_3}{|}}{CH}CH_2-$$

R=Na; and x, y and z each equal at least 1, the sum of x+y+z, on average, being equal to 3 to about 6.

In general, the method of preparing the compounds used in the invention is well known to those skilled in the art. Thus, the compounds are prepared by reacting carbon disulfide with an alkoxylated primary amine in the presence of caustic, e.g., NaOH.

Representative primary amines which are used to prepare the compounds finding use in the method of the invention are represented by the following formula:

Reaction

[Reaction scheme producing compound with x + y + z = 5.6]

| Reactants | |
|---|---|
| Jeffamine T-403 | 85 gms (0.21 m) |
| CS$_2$ | 46 gms (0.60 m) |
| NaOH | 24 gms (0.60 m) |
| H$_2$O | 155 gms | wherein R and R$_1$ are as defined in formula 1. A specific example of such an amine is Jeffamine T-403, available from Jefferson Chemical Company.

The compounds of the invention have utility as reverse demulsifiers (demulsification of oil-in-water emulsions).

EXAMPLE 1

$$H_2N\underset{}{+}R_1O\underset{\overline{y}}{)}R\underset{}{(}\overset{\overset{(OR_1\underset{\overline{x}}{)}NH_2}{|}}{}+OR_1\underset{\overline{z}}{)}NH_2 \qquad 3$$

Procedure:

In a 500 ml flask, equipped with a magnetic stirrer, thermometer, dropping funnel and reflux condenser attached to a caustic scrubber, were placed 24 gms NaOH, 155 gms water and 85 gms Jeffamine T-403. The mixture was cooled externally in an ice bath to 10–15° C. and 46 gms CS$_2$ was added over a period of 10 minutes with vigorous stirring while maintaining the temperature below 15° C. After an additional 10 minutes at about 15° C., the ice bath was removed and the mixture was allowed to warm to room temperature (25° C.) and stirring continued for 1 hour.

BREAKING EMULSIONS OF THE OIL-IN-WATER CLASS

The present invention relates to a process for resolving or separating emulsions of the oil-in-water class, i.e., so-called reverse (o/w) emulsions, by subjecting the emulsion to the action of the compounds of this invention.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many, and possibly most, cases a minor one.

Oilfield emulsions containing small proportions of crude petroleum oil relatively stably dispersed in water or brine are representative oil-in-water emulsions. Other oil-in-water emulsions include steam cylinder emulsions, in which traces of lubricating oil are found dispersed in condensed steam from steam engines and steam pumps, wax-hexane-water emulsions encountered in de-waxing operations in oil refining, butadiene tar-in-water emulsions formed in the manufacture of butadiene from heavy naphtha by cracking in gas generators and occurring particularly in the wash box waters of such systems, emulsions of "flux oil" in steam condensate produced in the catalytic dehydrogenation of butylene to produce butadiene, styrene-in-water emulsions in synthetic rubber plants; synthetic latex-in-water emulsions formed in plants producing copolymer butadiene-styrene or GR-S synthetic rubber, oil-in-water emulsions occurring in the cooling water systems of gasoline absorption plants, pipe press emulsions from steam-actuated presses in clay pipe manufacture, emulsions or petroleum residues-in-diethylene glycol formed in the dehydration of natural gas.

In other industries and arts, emulsions of oily materials in water or other non-oily media are encountered, for example, in synthetic resin emulsion paint formulation, milk and mayonnaise processing, marine ballast water disposal and furniture polish formulation. In cleaning the equipment used in processing such products, diluted oil-in-water emulsions are inadvertently, incidentally or accidentally produced. The disposal of aqueous wastes is, in general, hampered by the presence of oil-in-water emulsions. Steam distillation and other production procedures sometimes cause oil-in-water emulsions to be produced, from which the essential oils are difficultly recoverable.

Essential oils comprise non-saponifiable materials like terpenes, lactones, and alcohols. They also contain saponifiable esters or mixtures of saponifiable and non-saponifiable materials.

In all such examples, a non-aqueous or oily materials is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media, in addition to water itself.

Oil-in-water emulsions contain widely differing proportions of dispersed phase. Where the emulsion is a waste product resulting from a flushing with water of manufacturing areas or equipment, the oil content may be only a few parts per million. Resin emulsion paints contain a major proportion of dispersed phase. Naturally occuring oil field emulsions of the oil-in-water class carry crude oil in proportions varying from a few parts per million to about 20%, or even higher in rare cases.

This aspect of the present invention is concerned with the resolution of these emulsions of the oil-in-water class which contain a minor proportion of dispersed phase, i.e., ranging from 20% down to a few parts per million.

Although the present invention relates to emulsions containing as much as 20% dispersed oily material, many of them contain appreciably less than this amount of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exits, and that, for example, an emulsion containing 1.0% of dispersed phase will respond to the process, whereas one containing 1.1% of the same dispersed phase will remain unaffected. In general, however, dispersed phase proportions of the order of 1% or less appear most favorable for application of the present process.

In emulsions having high proportions of dispersed phase, appreciable amounts of some emulsifying agent are probably present, thus accounting for their stability. In the case of more dilute emulsions, containing 1% or less of dispersed phase, there may be difficulty in accounting for their stability on the basis of the presence of an emulsifying agent in the conventional sense. For example, steam condensate frequently contains very small proportions of refined petroleum lubricating oil in extremely stable dispersion, yet neither the steam condensate nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than about 1% of dispersed phase, which emulsions are the most important, in view of their common occurrence.

The process which constitutes the present invention comprises subjecting an emulsion of the oil-in-water class to the action of a compound of the kind hereindescribed or a composition containing same, thereby causing the oil particles in the emulsion to coalesce sufficiently to rise to the surface of the non-oil layer (or settle to the bottom, if the oil density is greater), when the mixture is allowed to stand in the quiescent state after treatment with the compound.

In operating the present process to resolve an oil-in-water emulsion, a compound of the invention is introduced at any convenient point in the system and it is mixed with the emulsion in any desired manner, such as by being pumped or circulated through the system or by mechanical agitation, such as paddles or by gas agitation. After mixing, the mixture of emulsion and added compound is allowed to stand quiescent until the constituent phases of the emulsion separate. Settling times and optimum mixing times will, of course, vary with the nature of the emulsions and the apparatus available. The operation, in its broadest concept, is simply the introduction of a compound of the invention into the emulsion, the mixing of the two to establish contact and promote coalescence, and, usually, the subsequent quiescent settling of the agitated mixture to produce the aqueous and non-aqueous emulsion phases as stratified layers.

Agitation may be achieved in various ways. The piping system through which the emulsion is passed during processing may itself supply sufficient turbulence to achieve adequate mixing of reagent and emulsion. Baffled pipe may be inserted to provide agitation. Other devices such as perforated chamber mixers, excelsior- or mineral- or gravel- or steel shaving-packed tanks or beds or stones or gravel or minerals in open ducts or trenches may be employed beneficially to provide mixing. The introduction of a gas, such as natural gas or air, into a tank or pipe in which or through which the mixture of compound and emulsion is standing or passing is frequently found suitable to provide desired agitation.

It has been found that the compound feed rate, agitation and settling time are somewhat inter-related. For example, with sufficient agitation of proper intensity the settling time required can be materially shortened. On the other hand, if agitation is not available but extended settling time is, the process may be equally productive of satisfactory results. The compound feed rate has an optimum range which is sufficiently wide to meet the tolerances required for the variances encountered daily in commercial operations.

The details of the mechanical structures required to produce aeration suitable for the present purpose need not be given here. It is sufficient to state that any means capable of producing small gas bubbles within the body of the emulsion is acceptable for use.

The order in which the compound and the aeration step are applied is relatively immaterial. Sometimes it is more convenient to treat the emulsion with the compound and subsequently to apply the aeration technique. In others, it may be more advantageous to produce a strongly frothing emulsion and then introduce the compound into such aerated emulsion.

Any desired gas can be substituted for air in an aeration step. Other commonly suitable gases include natural gas, nitrogen, carbon dioxide, oxygen, and the like, the gas being used essentially for its lifting effect. If any gas has some deleterious effect on any component of the emulsion, it will obviously be desirable to use, instead, some other gas which is inert under the conditions of use.

The compounds of the invention may be employed alone, or as mixtures, or they may in some instances be employed to advantage admixed with each compatible oil-in-water demulsifiers.

The process is commonly practiced simply by introducing small proportions of the compound into an oil-in-water emulsion, agitating to secure distribution of the compound and incipient coalescence and letting the mixture stand until the oil phase separates. The proportion of compound required will vary with the character of the emulsion to be resolved.

Ordinarily, proportions of compound required are from about 1 ppm to about 3000 ppm based on the volume of emulsion treated, but more or less may be required in specific instances. Preferably from about 10 ppm to 1000 ppm is employed, especially about 10 ppm to about 100 ppm.

A preferred method of practicing the process to resolve a petroleum oil-in-water emulsion is as follows: Flow the oil well fluids, consisting of free oil, oil-in-water emulsion, and natural gas, through a conventional gas separator, then to a conventional steel oil field tank, of, for example, 5,000 bbl. capacity. In this tank the oil-in-water emulsion falls to the bottom, is withdrawn, and is so separated from the free oil. The oil-in-water emulsion, so withdrawn, is subjected to the action of a compound into the stream of oil-in-water emulsion being accomplished by means of a conventional proportioning pump or chemical feeder. The proportion employed, in any instance, is determined by trial and error. The mixture of emulsion and compound then flows to a pond or sump wherein it remains quiescent and the previously emulsified oil separates, rises to the surface and is removed. The separated water, containing relatively little to substantially none of the previously emulsified oil, is thereafter discarded or recycled.

EXAMPLE 2

The compound of Example 1 was subjected to bottle testing to determine effectiveness as a reverse demulsifier. The product was tested in the following fashion:

Test water (100 ml. of oil field water containing an o/w emulsion of produced water and oil) was placed in a 150 ml test bottle. An amount of the compound was added to the bottle and the bottle was agitated by hand or machine shaking for 100 shakes. The bottom was then observed. The object of the test is to determine how fast the emulsion breaks and the clearness of the separated water. The results are set forth in the following table:

TABLE 1

| Compound | Concentration (ppm) | Break Time | Comments |
| --- | --- | --- | --- |
| Example 1 | 40 | 30 sec | Sparkling clear water |

The test indicates that the compound of Example 1 is effective as a reverse demulsifier. It is considered that all of the compounds within the scope of formula 1 would be effective as reverse demulsifiers.

EXAMPLE 3

The compound of Example 1 was subjected to additional bottle tests and was found to provide sparkling clear water with minimum agitation (50 shakes) at concentrations of 5–50 ppm.

EXAMPLE 4

The compound of Example 1 was field tested at 10 ppm in a producing oil well site in Michigan. It was determined that the compound quickly broke a very tight o/w emulsion and reduced the oil levels of injection water from about 280 ppm (as determined by Wilks IR analyzer) to levels as low as 20 ppm.

It should further be understood that the compounds of the invention may be formulated with other demulsifiers and other materials useful in the art to which the invention pertains. Thus, the compounds may be dispersed or dissolved in appropriate water soluble diluents and solvents such as water or alcohols, e.g. methanol, and mixtures thereof and may be used in conjunction with surfactants and other chemical treating agents useful for such purposes.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. Method of resolving an oil-in-water emulsions comprising adding to the emulsion an effective demulsifying amount of a composition comprising a compound represented by the formula

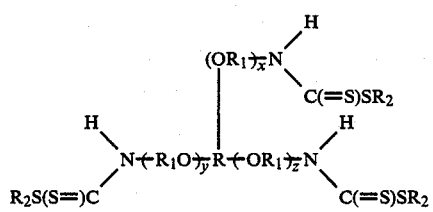

wherein:
R represents an alkane triyl group of 1 to 30 carbon atoms;
$R_1$ represents an alkylene group of 1 to 30 carbon atoms;
$R_2$ represents an alkali or alkaline earth metal group or an ammonium group; and
x, y and z represent integers which may be the same or different but each must equal at least 1, the sum of x+y+z, on average, being equal to 3 to 250.

2. Method of claim 1 wherein said compound is represented by the formula

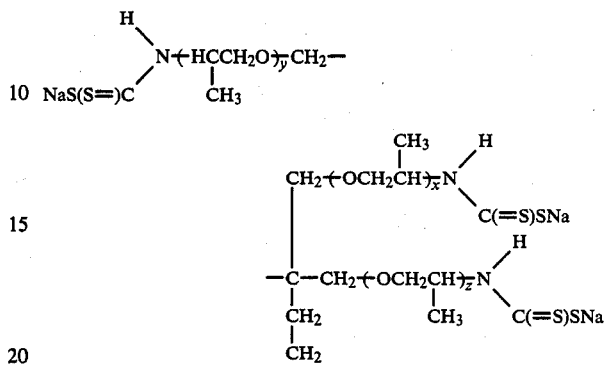

wherein the sum of x+y+z, on average, equals 3 to about 6.

3. Method of claim 1 wherein the sum of x+y+z, on average, equals 3 to 100.

4. Method of claim 1 wherein the sum of x+y+z, on average, equals 3 to 50.

5. Method of claim 1 wherein the sum of x+y+z, on average, equals 3 to 10.

* * * * *